(12) United States Patent
Bonfilio et al.

(10) Patent No.: US 6,287,205 B1
(45) Date of Patent: Sep. 11, 2001

(54) DUAL MASS DAMPING FLYWHEEL, IN PARTICULAR FOR MOTOR VEHICLE

(75) Inventors: Ciriaco Bonfilio, Clichy; Jean-Claude Bochot, Claye-Souilly; Daniel Fenioux, Epinay-sur-Seine, all of (FR)

(73) Assignee: Valeo (FR)

( * ) Notice: Subject to any disclaimer, the term of this patent is extended or adjusted under 35 U.S.C. 154(b) by 0 days.

(21) Appl. No.: 09/555,858

(22) PCT Filed: Oct. 7, 1999

(86) PCT No.: PCT/FR99/02409

§ 371 Date: Jun. 6, 2000

§ 102(e) Date: Jun. 6, 2000

(87) PCT Pub. No.: WO00/20777

PCT Pub. Date: Apr. 13, 2000

(30) Foreign Application Priority Data

Oct. 7, 1998 (FR) .................................................. 98 12567

(51) Int. Cl.⁷ ................................ F16F 15/22; F16D 3/14
(52) U.S. Cl. ........................... 464/68; 74/574; 192/70.17; 192/214.1
(58) Field of Search .......................... 192/214.1, 213.31, 192/70.17, 213.3, 214; 464/62, 68; 74/574, 572

(56) References Cited

U.S. PATENT DOCUMENTS

| | | | | |
|---|---|---|---|---|
| 4,904,226 | * | 2/1990 | Chasseguet et al. | 464/68 |
| 4,996,892 | * | 3/1991 | Yamamotto | 74/574 |
| 5,146,811 | * | 9/1992 | Jackel | 74/574 |
| 5,168,775 | * | 12/1992 | Naudin et al. | 464/68 |
| 5,176,233 | * | 1/1993 | Woerner et al. | 74/574 |
| 5,384,948 | * | 1/1995 | Bonfilio et al. | 74/574 |
| 5,496,224 | * | 3/1996 | Rohs et al. | 74/574 |
| 5,823,311 | * | 10/1998 | Mokdad et al. | 74/574 |
| 5,934,654 | * | 8/1999 | Mokdad et al. | 192/213.3 |
| 6,062,103 | * | 5/2000 | Soares et al. | 74/574 |

* cited by examiner

*Primary Examiner*—Anthony Knight
*Assistant Examiner*—Kenn Thompson
(74) *Attorney, Agent, or Firm*—Liniak, Berenato, Longacre & White (57) ABSTRACT

The invention concerns a dual mass damping flywheel comprising a secondary flywheel (13) including a torque limiter (19) interposed between a hub (18) external periphery and the internal periphery a reaction plate (16) Whereon is directly mounted an internal ring (160) made of different material. The invention is applicable to motor vehicles.

10 Claims, 7 Drawing Sheets

DUAL MASS DAMPING FLYWHEEL, IN PARTICULAR FOR MOTOR VEHICLE

The present invention relates to a dual mass damping flywheel for coupling an internal combustion engine in rotation to a transmission system, in particular for a motor vehicle.

Such a dual mass double flywheel is described in the document FR-A-2 749 904. In this latter, a torque limiter is interposed operatively between a plate, constituting the reaction plate of a friction clutch, and an internal hub which is surrounded by the reaction plate.

The reaction plate and the hub are part of a secondary flywheel which is adapted, through a friction face of the reaction plate, to be coupled disengageably with a driven member of a transmission system, such as the input shaft of a gearbox of a motor vehicle.

The dual mass flywheel also comprises a primary flywheel which is arranged to be coupled in rotation to a driving shaft, such as the crankshaft of an internal combustion engine of a motor vehicle.

The secondary flywheel is mounted for rotation, by means of its hub, on the primary flywheel, which includes a generally transversely orientated element such as a plate which is parallel to the reaction plate of the secondary flywheel.

Resilient members are interposed operatively between the transverse element of the primary flywheel and the hub of the secondary flywheel so as to couple the secondary flywheel elastically to the primary flywheel.

The resilient members may consist of curved springs, in particular pre-curved springs, which act circumferentially between abutment elements fixed with respect to the primary flywheel and arms which are provided at the outer periphery of a disc which is fixed with respect to the hub of the secondary flywheel. The arms are disposed between two abutment elements of the primary flywheel, in facing relationship with each other.

In another version, the resilient members act radially in the rest position of the dual mass damping flywheel.

In the document FR-A-2 749 904, the torque limiter has a friction ring which is provided with outwardly aligned lugs which extend through apertures formed in a ring with axial elasticity, which is fixed with respect to the hub.

The friction ring defines the flank of a groove, the other flank of which, and the base of which, are part of the outer periphery of the hub. The reaction plate has at its inner periphery an internal ring portion which is centred by the base of the groove and which is pinched between the flanks of the groove. This arrangement gives satisfaction because it is of reduced axial size.

The internal ring portion therefore ensures a frictional coupling which is elastically preloaded, between the reaction plate and the internal hub which are thereby assembled together with the reaction plate.

The Applicant has enquired whether it would not be possible to make use of the internal ring portion without increasing axial size.

The object of the present invention is to respond in a simple and inexpensive way to this requirement. According to the invention, a dual mass flywheel of the type defined above is characterised in that the internal ring portion is carried on the reaction plate and is of a different material.

The assembly consisting of the reaction plate and the internal ring portion is thus made of two materials, constituting the outer part of the secondary flywheel.

The invention is characterised by the assembly of the internal ring portion with the reaction plate.

Thanks to the invention, while keeping the axial size small in the region of the torque limiter, it is possible to obtain different mechanical and kinematic characteristics in the external part and in the central part of the assembly that consists of the reaction plate and the internal ring portion.

The secondary flywheel, the external part of which constitutes the reaction plate, has good resistance to heat and is rigid enough to resist the axial and centrifugal forces which are exerted on it in operation.

The reaction plate is of a mouldable material having suitably adequate friction characteristics. It is preferably a casting so as to give it the desired inertia. In another version, it is aluminium based, which was not possible in the prior art, while the friction face which it presents for contact with the friction liner of a friction disc may consist of a layer which is fixed in any suitable way on the material of the reaction plate, with the desired coefficient of friction. All of this is made possible because the internal ring portion is of a different material from the reaction plate and may be given the desired thickness and mechanical strength. This ring portion enables the axial size to be small in the region of the torque limiter despite the stack of components at this point, and this is achieved with reduced weight since the ring portion is, preferably, of metal. It is for example made from steel sheet. The steel sheet is, in one embodiment, heat treated so as to give it the desired hardness. In another version, the steel sheet is coated with a wear-resistant layer. The internal ring portion may therefore have a complex form, as is called for because of its function.

In one embodiment, this ring portion is thinner than the ring portion of the prior art, and wears to a lesser extent than a ring which is cast, so that the useful life of the dual mass damping flywheel is increased. Preferably, the internal ring is thinner than the reaction plate. The reduction in thickness of the internal ring enables the axial size of the torque limiter to be reduced, or alternatively, for the same size, it enables its performance to be increased by giving the torque limiter several axially acting resilient rings.

This ring will easily absorb the stresses to which it is subjected. The ring may be made by press-forming, with, if necessary, a plurality of pieces being welded together and being of the metal specification most appropriate to its function. The assembly of the ring on the reaction plate may be obtained in any appropriate way, for example by in situ moulding of the reaction plate on the internal ring which has interruptions such as holes, or hooking projections, or, alternatively, by seaming of lugs of the ring on the reaction plate.

In one embodiment the ring has only one active face, which enables its axial size to be reduced even more. This face serves as a friction face for contact with another friction face that is mounted in rotation on the internal hub or on a component fixed to the latter. This arrangement also enables the internal hub to be simplified by reducing the consumption of material for the latter. A cage may be formed, which is bounded by the internal ring portion and a component fixed to the internal hub, the internal ring portion being closer to the primary flywheel and offset axially with respect to the radial axis of symmetry of the reaction plate, towards the primary flywheel. The axially acting resilient means of the torque limiter are lodged within this cage. This is made possible because, in the way described above, the internal ring portion can be given the desired form and the required length. This ring may therefore extend further down than the internal ring in the prior art, which enables the consumption of material for the internal hub to be reduced. In general terms, the coefficient of friction of the material of the reaction plate may be different from that of the material of the internal ring, which enables the functions of the internal ring and the reaction plate to be optimised, given that the internal ring may be coated with a layer, or even a friction liner, which enables its wear to be reduced and/or its coefficient of friction to be limited.

Within the above mentioned cage, there may be mounted axially acting resilient means in the form of at least one element of elastic material such as an elastomer. The component fixed to the internal hub serves, in one embodiment, to centre the reaction plate, being configured at its outer periphery so as to come into intimate contact with the inner periphery of the reaction plate. For example, this component has at its outer periphery an axially orientated annular flange which comes into intimate contact with the inner periphery of the reaction plate. This flange, through its inner periphery, may serve to drive a distribution ring in rotation through an interposed member which is for example a Belleville ring or diaphragm, bearing on the component fixed to the internal hub so as to bias the distribution ring in such a way as to grip a friction liner between the distribution ring and the internal ring or a member fixed in rotation to the latter. The internal ring may be frusto-conical at its inner periphery so as to come into contact with a complementary frusto-conical surface of the hub, which enables the performance of the torque limiter to be increased. The member which is fixed to the internal hub therefore constitutes a backing element.

Because of the invention, it is easily possible to form a cavity radially inward of the reaction plate to contain at least partly the components of the torque limiter.

Thus, in one embodiment, the internal hub is so configured as to delimit a cavity radially inwards of the internal ring portion which is fixed with respect to the reaction plate. Mounted inside the cavity, there is at least one abutment element which is fixed with respect to the friction ring and offset axially towards the primary flywheel with respect to the friction ring. Radially inwards of the internal ring portion of the reaction plate, the axially acting resilient means bear on the abutment element and on at least one backing element which is fixed to a support member fixed to the internal hub, whereby to grip the ring portion between the flanks of the groove.

Thanks to these arrangements, the function of the torque limiter is improved, especially in terms of its torque transmitting capacity and its useful life, because it is possible to control precisely the load exerted by the axially acting resilient means because the latter act between an abutment element and a backing element, both of which may be of divided form, and which are part of two separate components. The support piece fixed to the hub is located radially inward of the friction ring and therefore has a small radial dimension.

Because of the cavity which is bounded by the internal hub, the same axial size is generally retained in the region of the torque limiter. In practice the axial size is reduced because there is no component superimposed on the friction ring, since the resilient means act radially inwardly of the internal ring portion. In addition, there are no longer any straightened up lugs. In general terms, the abutment element or elements are lodged within a cavity which is preferably open axially away from the primary flywheel. The solution is therefore simple and inexpensive, because the support piece fixed with respect to the hub is joined to the latter by means of rivets, which in one embodiment constitute articulating pivot pins for the resilient members, or fastening rivets for a disc which acts on the resilient members. The friction ring is preferably inclined in the rest position and is then straightened up, its inclination becoming smaller, after it has been fitted, under the action of the resilient means so that the friction ring closely matches the form of the ring portion of the reaction plate, and the performance of the torque limiter is improved. The torque limiter is then able to transmit a greater amount of torque.

It will also be appreciated that the axially acting resilient means are located radially inwards of the reaction plate of the secondary flywheel. As a result, the resilient means are cooler than in the prior art, because they are further away from the friction face of the reaction plate.

This arrangement favours a reduction in axial size, so as better to control the characteristics of the torque limiter and improve the useful life of the latter. The cavity in accordance with the invention favours cooling of the internal hub and therefore the bearing means which are interposed operatively between the hub and a central first hub of the primary flywheel.

The abutment element and the backing element are preferably orientated transversely, and are offset axially with respect to each other.

The axially acting resilient means may consist of a plurality of helical springs. Preferably, in order to reduce axial size the axially acting resilient means comprise a Belleville ring. They may for example consist of a diaphragm, that is to say a component which includes at its outer periphery a Belleville ring which is extended radially inwards by a central portion divided into lugs by slots which separate the lugs from each other.

The resilient means preferably consist of a Belleville ring. The Belleville ring or the diaphragm is in contact at its outer periphery with the abutment means and at its inner periphery with the backing element.

Because of the Belleville ring of the axially acting resilient means it is possible to increase the useful life of the torque limiter because the latter is less sensitive to wear than that in the prior art.

In this connection, this results from the fact that the Belleville ring works between two separate components so that it is possible to obtain better control of its characteristic curve (of force exerted as a function of deflection).

As is known, this characteristic curve has a form which is generally a portion of a sine curve, so that the initial force exerted by the Belleville ring is chosen beyond the maximum of the curve, that is to say for a deflection greater than that which corresponds to the said maximum. This initial load is of course chosen to be close to the maximum of the characteristic curve.

In one embodiment, the base of the groove is defined by the hub which is hollow radially inwards of the internal ring portion, so as to form a cavity which is open axially away from the primary flywheel. The abutment element according to the invention is lodged within this cavity. The internal hub therefore has a reduced thickness radially inwards of the internal ring portion. More precisely, the base of the groove of the hub is provided by a sleeve portion the internal periphery of which serves to centre the friction ring, with its outer periphery serving to centre the internal ring portion.

This friction ring is coupled in rotation to the hub in mating cooperation.

For example, the abutment element is extended at its inner periphery by at least one transversely orientated lug which is engaged in a notch formed in the hub.

Preferably, at least two lugs and two notches are provided, these being in diametrically opposed positions.

Thus, with an open cavity formed in the hub, and one component additional to the torque limiter of the prior art, improved control of the function and characteristics of the torque limiter is obtained, and this is achieved generally within the same size limitations, and in practice within an axial size which is slightly reduced. As a result, for a given size, at least one of the flanks of the groove and at least one of the associated faces of the ring portion may be frustoconical so as to increase the torque transmitted. By making the holes in the base of the cavity, that is to say in the hub, cooling of the torque limiter is improved. In another version, the hub has a reduced thickness radially inwards of the internal ring portion by virtue of a radial plate which it has for this purpose. It is the outer periphery of this radial plate that serves to centre the reaction plate.

In one embodiment, the outer periphery of the radial plate is in intimate contact with an annular, axially orientated surface which joins the outer periphery of the internal ring portion to the side face of the reaction plate that faces towards the primary flywheel.

Debris will be produced by frictional contact of the radial plate with the ring portion. In order to evacuate this debris, notches are formed at the periphery of the radial plate.

In another version, the friction ring is coupled in rotation with the backing element by mating cooperation, through its abutment element. The abutment element comprises for example at least one lug which is engaged in an associated hole formed in the backing element.

In a further version, the backing element is provided with a press-formed element which is for example U-shaped and in which the lug of the abutment element is engaged. This solution is inexpensive because the hub remains unchanged.

Similarly, the solution in which the reaction plate is centred by a radial plate of the hub is advantageous because it enables radial size to be reduced due to the fact that the hub no longer has a central sleeve portion. It emerges from the foregoing that the backing element may serve to centre the friction ring. For this purpose it is sufficient to give the abutment element of the friction ring at least two of the above mentioned lugs engaged in two holes, or two associated pressed out portions formed in the backing element.

The web portion may be distinct from the hub, being then fixed to the latter, for example by being applied by in situ moulding or seaming.

The same is true for the internal ring portion according to the invention. This enables the thickness of the internal ring portion to be reduced and therefore enables axial size to be reduced. In general terms, the web portion or the internal ring portion may be assembled with the hub and the reaction plate, respectively, in any way.

The internal ring is for example of metal. The same is true of the web. These latter can be coated with a wear resistant layer, which is for example nickel or molybdenum based. These components can be made inexpensively in sheet steel hardened by a heat treatment operation. All of this enables the useful life of the dual mass flywheel to be increased because the internal ring portion becomes worn to a lesser extent than the internal ring portion formed integrally by moulding with the reaction plate, which is for example a casting.

The following description illustrates the invention with reference to the attached drawings, in which.

In the drawings the dual mass damping flywheel 11 works between the crankshaft of the internal combustion engine of a motor vehicle and the input member of the transmission system, namely the input shaft of the gearbox.

Figure 5:
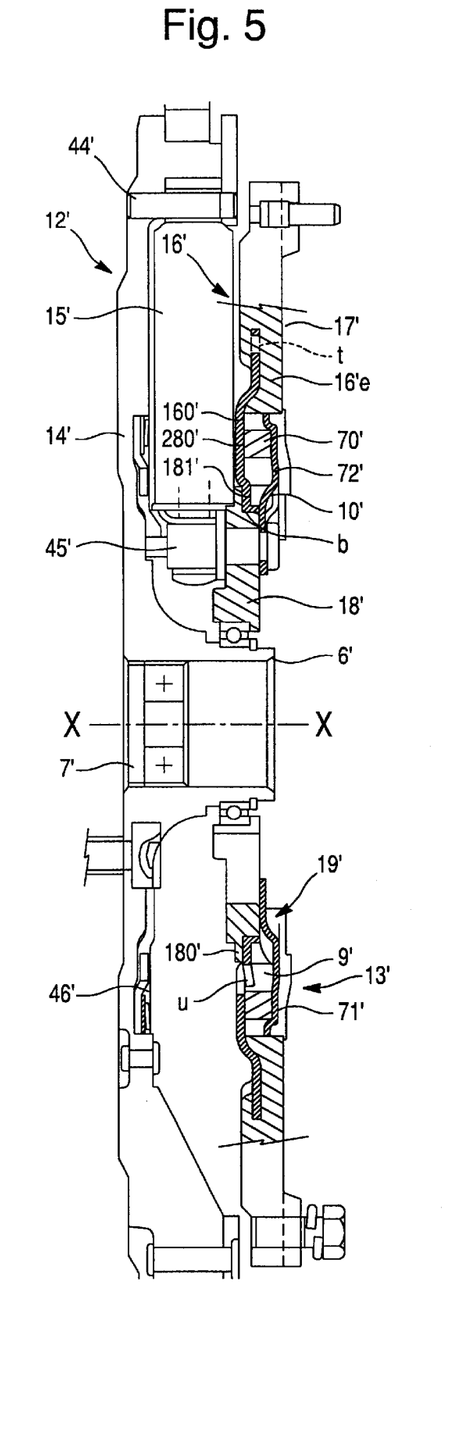
FIG. 5 is a partial view in axial cross section of the dual mass damping flywheel in a second embodiment.
Figure 6:
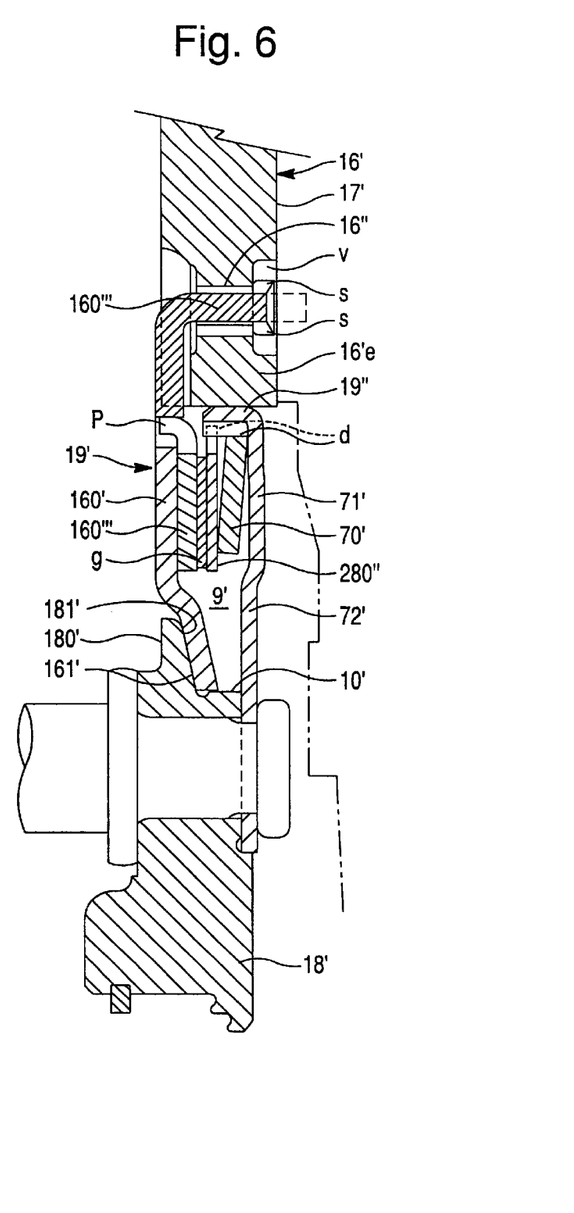
FIG. 6 is a view similar to FIG. 2, for a third embodiment.

For simplicity, those elements that are common are given the same reference signs in FIGS. 1 to 4 and 7 to 9, with a prime index in FIGS. 5 and 6.

The dual mass damping flywheel, which in this case gives torsion damping for coupling an internal combustion engine to a transmission system, comprises (see FIGS. 1 to 4) a primary flywheel 12 and a secondary flywheel 13 which are coaxial with each other and mounted for rotary motion of one with respect to the other about a common axis of axial symmetry X—X, against the action of an axially acting friction device 46 and resilient damping devices 15 which are orientated generally radially, and which are spaced apart at regular circumferential intervals as described in the document FR-A-9 712 115 published under the number FR-A-2 769 062, to which reference should be made for more detail.

Figure 3:
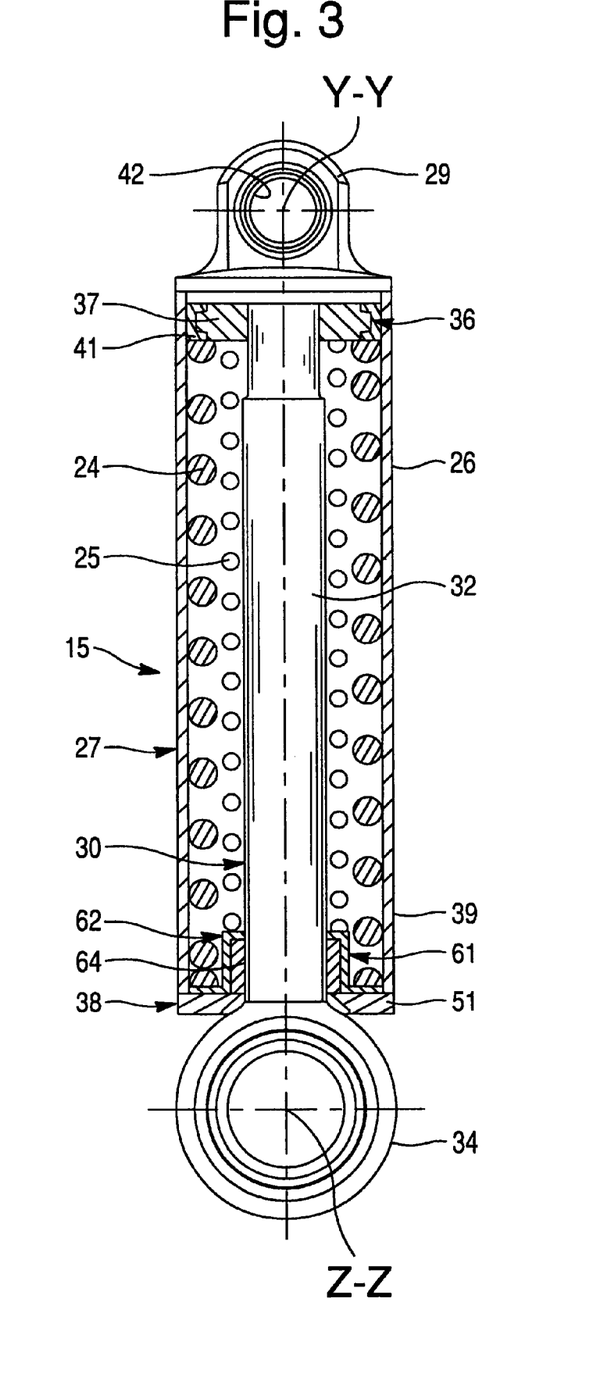
FIG. 3 is a detail view showing in partial cross section a resilient member of the dual mass damping flywheel.
Figure 4:
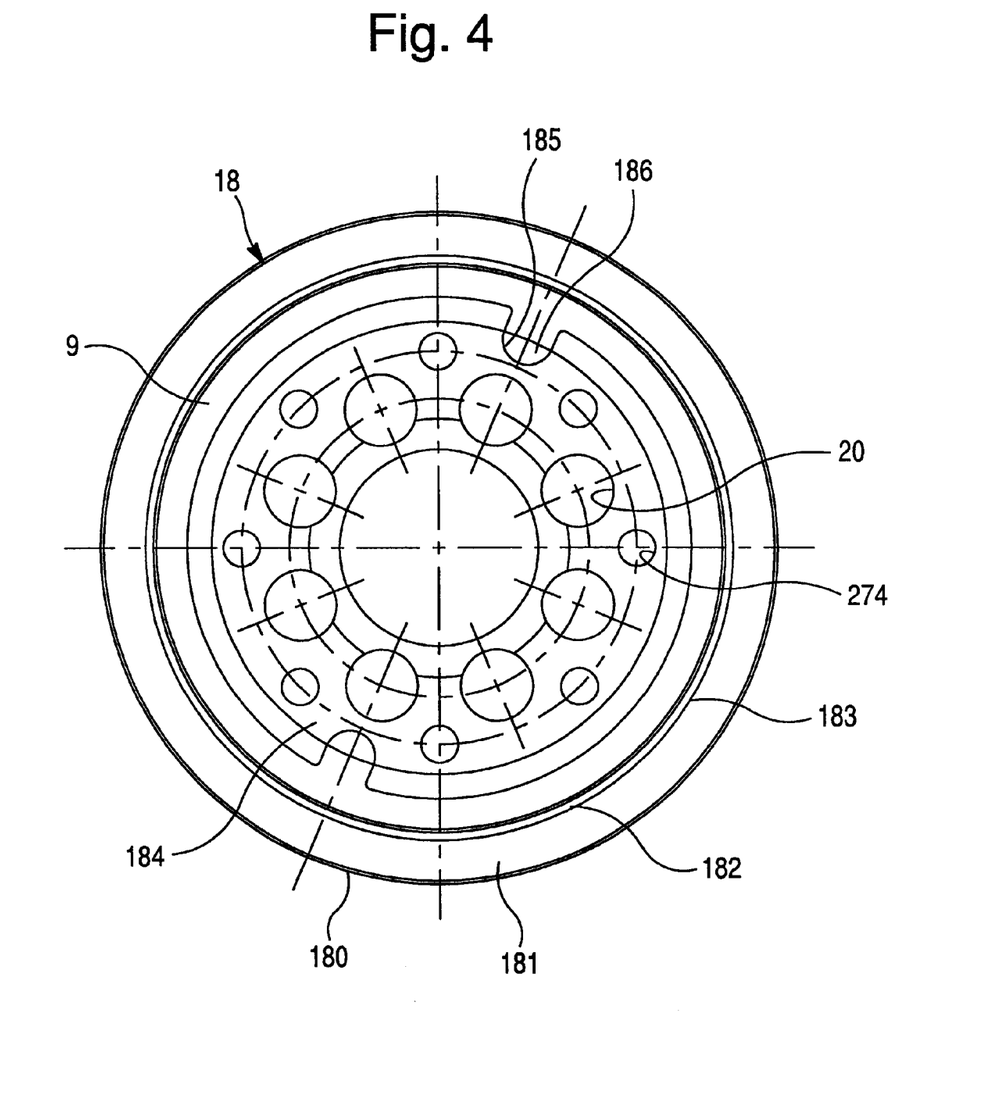
FIG. 4 is a view in the direction of the arrow 4 in FIG. 1, showing the hub of the secondary flywheel.

Thus, as can be seen in FIG. 3, each damping device 15 encloses at least one helical spring 24 within a casing 26 which is part of a first sub-assembly 27 that has, at its outer periphery, a first articulation piece 29 having a cylindrical hole 42, which defines an articulation axis Y—Y. The piece 29 is secured by welding on the casing 26 which is of tubular form.

The resilient damping device 15 also includes a second sub-assembly 30 which in this example comprises two concentric helical springs 24, 25 of different stiffnesses, mounted on a rod 32 which has a second articulation piece 34 formed with a cylindrical bore which defines an articulation axis Z—Z.

The springs 24, 25 bear on a piston 37 constituting a first abutment 36 situated at the upper end of the rod 32 which is mounted within the casing 26. A guide ring 41 is moulded on the outer periphery of the piston 37, which is fixed to the metal rod 32, in this example by welding.

The spring 24 surrounds the spring 25 and the rod 32, and bears on a second abutment 38 which is fixed to the end 39 of the casing 26 opposite the end that carries the first articulation piece 29. The second abutment 38 is plastically deformable, and includes a base 51 which is secured, in this example by welding, to the lower end of the casing 26. The rod 32 extends through the base 51. A plastically deformable means is disposed between the base 51 and the spring 24. This means comprises a cup member 61 with a skirt which surrounds the rod 32, from which it is spaced radially, the skirt having a transverse annular flange 62 on which the end of the spring 25, which has the lower stiffness, bears.

A guide ring 64 is located within the space defined by the rod 32, the base 51 and the cup member 61. The cup member 61 comprises an annular washer having, in cross section, a concave form for engagement by the spring 24. It is this portion that is plastically deformable. In modified versions, the other embodiments shown in the document FR-97 12115, published under the number FR-A-2 769 062, are of course applicable to the present invention.

For each device 15, the number of which depends on the application, a pivot pin 45 is riveted to the inner periphery of the secondary flywheel 13. This pivot pin 45 is mounted on an internal hub 18 of the secondary flywheel 13, which is also referred to as the second mass. A bearing, not shown, is interposed radially between the outer periphery of the pivot pin 45 and the cylindrical bore of the second articulation piece 34. Similarly, a pivot pin 44 is mounted at the outer periphery of a transverse element 14 of the primary flywheel 12, which is also referred to as the first mass. A bearing, not shown, is mounted between the outer periphery of the pivot pin 44 and the hole 42 of the first articulation head 29.

Each damping device 15 is thus mounted so that it is articulated between the primary flywheel 12 and the secondary flywheel 13, between the two axes Y—Y and Z—Z. Any circumferential relative movement between the two flywheels 12, 13 is converted into a lengthening of each resilient damping device, resulting in compression of the radially orientated springs 24, 25 in the rest position of the dual mass damping flywheel.

For more detail, reference should be made to the document FR-97 12115 mentioned above, and especially to FIG. 1 of the latter which shows the compression of the radially acting springs 24, 25.

In FIG. 2 of that document it can also be seen that the secondary flywheel 13 includes a plate portion 16 which constitutes the reaction plate of a friction clutch having a friction disc which is arranged to be coupled in rotation to the input shaft of the transmission system, namely, in the present case, the input shaft of the gearbox. The friction disc is provided with at least one friction liner at its outer periphery.

Figure 1:
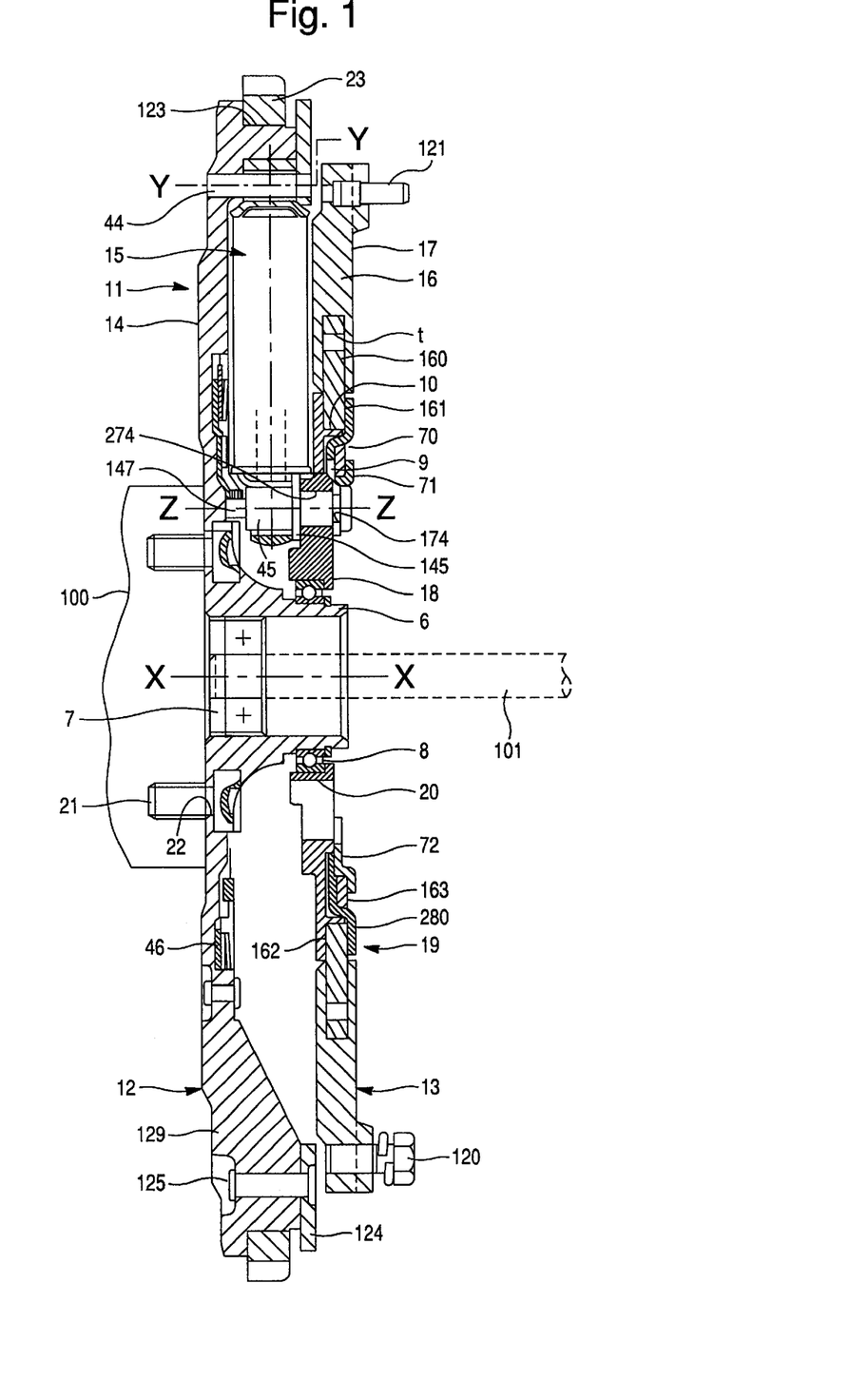
FIG. 1 is a view in axial cross section of a dual mass damping flywheel in accordance with the invention.

The friction clutch includes a cover plate which is secured, by means of screws of which one can be seen at 120 in FIG. 1, to the reaction plate 16, which for this purpose is formed with threaded holes at its outer periphery. The plate 16 has a dorsal friction face 17.

The plate 16 also carries pins 121 for centring the cover plate. A diaphragm bears on the base of the cover plate, which is hollow, so as to act on a pressure plate which is coupled in rotation to the cover plate, and so as to clamp the friction liner or liners between the pressure and reaction plates. The clutch is normally engaged, and the torque from the internal combustion engine is transmitted here to the input shaft of the gearbox via the friction liner or liners of the friction disc. By acting on the inner ends of the fingers of the diaphragm, in this example in a thrust mode, with the aid of a declutching device of the manual, automatic or semi-automatic type, the diaphragm is caused to pivot so as to disengage the clutch and interrupt the torque transmission. Thus the reaction plate is coupled in rotation through its friction face 17 and in a disengageable way, via the friction disc, to the input shaft of the transmission.

For more detail, reference should be made for example to the document FR-98 09 638 filed on Jul. 28, 1998, and especially to FIG. 5 of the latter, given that the diaphragm is an embodiment of clutch engaging means, and that other versions can accordingly be envisaged. Similarly, the friction clutch may be provided with a device for compensating for wear in the friction liners of the friction disc.

In the light of that document (FIGS. 1 and 2), it will be noted that the resilient members working between the secondary flywheel [sic] may be circumferentially acting and may work between two guide rings fixed to the primary flywheel and a damper plate or central disc which is fixed to the hub of the secondary flywheel 13; the resilient members being mounted, for example, in a sealed chamber which is mainly carried by the primary flywheel 12 at the outer periphery of the latter.

The transverse element 14 of the primary flywheel 12 can include a metallic radial support plate as in FIGS. 3 to 6 of the said document FR-98 09638. The primary flywheel 12 may be fixed on the driving output shaft of the internal combustion engine by means of a second hub which constitutes a spacer between the said output shaft—in this case the crankshaft of the said engine—and a first hub 6 which is part of the primary flywheel 12.

In this example, the transverse element 14 consists of a plate of mouldable material, as does the reaction plate 16, constituting an inertia disc.

The plates 14 and 16 in this example are castings. In every case, the transverse element 14 (i.e. the radial web or the plates) is parallel to the reaction plate 16 having the dorsal friction face 17 for a friction liner of the friction disc. The resilient damping devices 15 work radially (see FIGS. 1 to ) or circumferentially (see FIG. 9) between the transverse element 14 and the central hub 18 of the secondary flywheel 13.

Accordingly, the resilient members 24, 25 are mounted within the space bounded by the components 14, 16 and 18. The axial offset of the reaction plate is obtained by virtue of the central first hub 6 of the primary flywheel 12.

The secondary flywheel 13 is mounted by means of its hub 18 for rotation on the first hub 6 of the primary flywheel 12, through bearing means 8 of small size, which are of the plain type or the ball bearing type.

The first hub 6 may carry an internal pilot bearing 7 for supporting the free end of the driven member, which in this example is the free end of the input shaft of the gearbox.

In this example, the bearing means 8 consist of a ball bearing which acts between the outer periphery of the first hub 6 and the inner periphery of the hub 18 of the secondary flywheel.

In another version the outer ring of the ball bearing may be formed in the hub 6 of the secondary flywheel, as described in the document FR-A-2 749 904.

In a further version, the ball bearing is fixed, using capacitor discharge welding, on the first hub 6 and the hub 18. In that case, the bearing 8 works axially between the first hub 6 and the second hub 18 of the secondary flywheel in the manner described in the document FR-A-2 754 034.

In all cases, the bearing means 8 are carried by the first hub 6 and work axially and/or radially between the first hub 6 and the hub 18, to provide rotary mounting of the secondary flywheel 13 on the primary flywheel 12. The hub 18 is an internal hub because it is surrounded by the reaction plate 16, with a torque limiter 19 being interposed between the plate 16 and the hub 18. This limiter 19 acts between the inner periphery of the reaction plate 16 and the outer periphery of the hub 18, which in this example is of treated steel. The reaction plate 16 is mounted for rotation on the internal hub 18 in a way to be described later herein. The said hub 18 is formed with passage holes 20 to allow passage of at least one tool for access to the heads of the fastening members 21 securing the primary flywheel, to the crankshaft of the engine of the motor vehicle in this example but, in another version, to the secondary hub fixed to the crankshaft.

The fastening members 21 consist in this example of screws, the heads of which have recesses which are engaged by the tool or tools, in this example for tightening. The screws 21 extend through holes 22 formed in the plate 14 in axial register with the passage holes 20.

The passage holes 20 are located radially outside the bearing means 8—which in this example consists of a rolling bearing 8 with a single row of balls—at the inner periphery of the hub 18.

The holes 20 have a diameter greater than that of the heads of the screws 21, which are therefore finally fitted by the motor vehicle manufacturer.

In another version, the screw heads have a diameter greater than that of the passage holes 20, so that the screws 21 are trapped in place for delivery to the vehicle manufacturer.

It will be noted that the primary flywheel 12 carries at its outer periphery the starter crown 23 for the motor vehicle.

More precisely, in FIGS. 1 to 4, the plate 14 is thickened at its outer periphery and the starter crown 23 is mounted in the known way by shrinking on an axially orientated and shouldered cylindrical surface 123 formed on the plate 14 at its outer periphery. The plate 14 also carries at its outer periphery a plate 124 in the form of a ring carrying the pivot pins 44, which are force-fitted in the plate 14. The ring 124 is fixed to the plate 14 by means of rivets 125.

Ears for carrying the pivot pins 44 are thus formed in mouldable material at the outer periphery of the plate 14; the first articulation pieces 29 are interleaved axially between the plate 14 and the ring 124, being also mounted on the pivot pins 44.

Between two of the pieces 29, the plate 14 has thickened portions 129 for increasing the inertia of the primary flywheel 12. The thickened portions 129 are generally triangular in form so that they do not interfere with the casings 26 of the resilient damping devices 15 which are interposed circumferentially in alternation between the thickened portions 129.

In this example the first hub 6 is integral with the plate 14. This hub 6 is formed by moulding with the plate 14.

Figure 9:
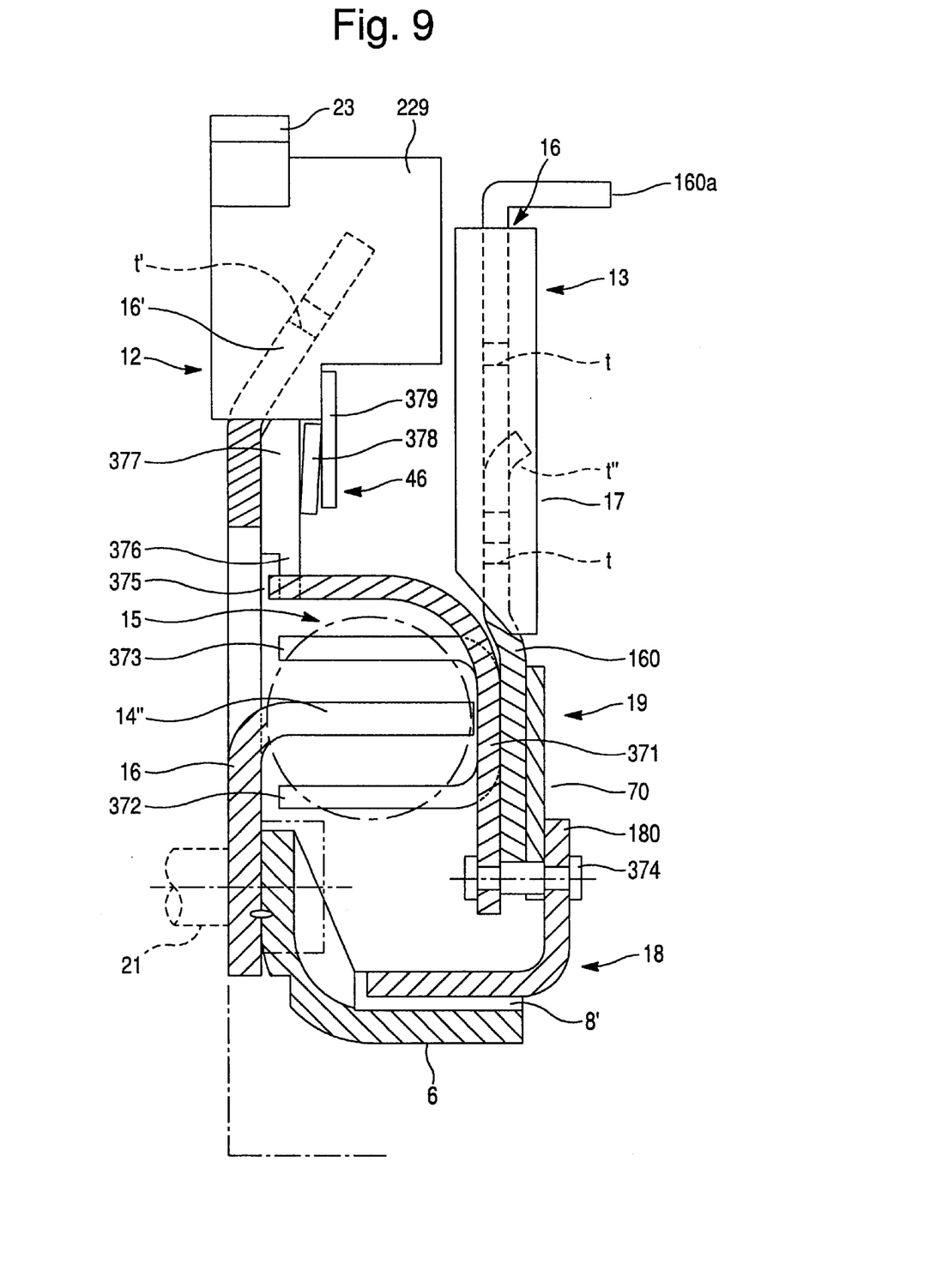
FIG. 9 is a view similar to FIG. 2, for a sixth embodiment.

In another version, the first hub 6 is of course attached, for example by riveting or welding, on the plate 14, or in general terms on the generally transversely orientated radial plate 14 as can be seen in FIG. 9. The axially acting friction means 46, of the same type as those described in the document FR-A-2 754 034, to which reference should be made for more detail. These means 46 act radially outside the passage holes 20 and pivot pins 45.

In this example the friction means 46 comprise a control ring 146 of plastics material which is able to engage frictionally against the dorsal face 114 of the plate 14 that faces towards the secondary flywheel 13.

The ring 146 is coupled in rotation to the secondary flywheel by means of axial projecting elements in the form of cylindrical pins 147 which are extensions of the pivot pins 45. To this end, each of the pins 147 penetrates into a notch (not shown) of the ring 146, formed at its inner periphery. At its outer periphery the ring 146 has an external tooth ring consisting of alternate teeth and notches.

A friction ring 148 surrounds the control ring 146 and has at its inner periphery an internal tooth ring consisting of alternate teeth and notches. The teeth of the two internal tooth rings extend with a circumferential clearance into the notches of the outer tooth ring and vice versa. The friction ring 148 therefore meshes with the control ring 146, with a circumferential clearance.

The ring 148 engages frictionally against the dorsal face 114 of the plate 14, or, in another version, on a component or a coating which is fixed on the face 114. A closure ring 151 is secured by means of rivets 152 to the plate 14. The rivets 152 are located radially outside the ring 148.

The control ring 146 is clamped between the face 114 and the inner periphery of the ring 151, which is of frusto-conical form radially inside the zone in which it is fixed to the plate 14. The ring 151 is formed with windows which can be seen in FIG. 17 of the document FR-A-2 754 034, so that the ring 151 is elastically deformable. An application ring 149 meshes with the plate 14 through a mating coupling, with lugs (not given a reference numeral) of the ring 149 penetrating into axial grooves (not given a reference numeral) which are formed in a thickened portion of the plate 14 radially inwards of the rivets 152. An axially acting resilient ring 150, which in this example is a Belleville ring, bears on the closure ring 151 so as to act on the application ring 149 which is movable axially with respect to the plate 14, and so as to grip the friction ring 148 between the face 114 and the application ring 151.

The control ring is gripped elastically between the face 114 and the inner periphery of the closure ring 151. During relative angular movement between the two flywheels 12, 13, the control ring 146 is driven in rotation by the pins 147 and makes permanent frictional contact between the face 114 and the ring 151. The friction ring 148 works differently after the clearance has been taken up between the external and internal tooth rings.

The ring 148 adds these effects together, with its frictional engagement between the face 114 and the application ring 151 fixed in rotation to the plate 14 being controlled by the Belleville ring 151, which in this example is stiffer than the ring 151.

All of this is described in the document FR-A-2 754 034 mentioned above. The rings 148, 146 are of course carried by the transverse element 14 of the reaction plate.

All of these arrangements fit well with the presence of the torque limiter 19 which is fitted in facing relationship with the friction means 46, radially outside the passages 20 on the one hand, and inside the rivets 152 and the friction face 17 on the other hand. In this example, the torque limiter has a friction ring 280, the mean radius of which is preferably generally equal to that of the friction ring 148, which is favourable to reduction in overall axial size.

More precisely, the reaction plate 16 constituting an inertia disc has at its inner periphery, radially inwards of the face 17, an internal annular ring portion 160, of reduced thickness and orientated transversely. This inner ring portion 160, which is thinner than the plate 16, is mounted for rotation within an annular groove 10 which is bounded laterally by a web portion 180 and the friction ring 280. The web portion 180 and the ring 280 are orientated transversely and are therefore at right angles to the axis X—X which constitutes the axis of rotation and axial symmetry of the dual mass torsion damping flywheel. The groove 10 is carried by the hub 18 and is formed on the outer periphery of the latter. In accordance with the invention, the internal ring portion 160 is fastened on the reaction plate 16, and is of a material different from that of the reaction plate 16, in the manner to be described below. Because of this arrangement, the reaction plate can be of an aluminium based material, which was not possible before, since aluminium is not suitable for the torque limiter.

Radially inwards of the groove 10, the torque limiter 19 also includes a ring 72, at least one backing element 71, axially acting resilient means 70, and at least one abutment element 271 which is fixed with respect to the friction ring 280 that is coupled in rotation to the internal hub 18 which is mounted for rotation on the first hub 8 through the interposed bearing means 8. The backing element 71 extends radially outwards with respect to the ring 72, to which it is fixed. The abutment element 271 extends inwardly with respect to the friction ring 280.

The ring portion 160 has a cylindrical internal bore 163 which is centred by the outer periphery 183 of an axially orientated annular sleeve portion 182 of the internal hub 18, this sleeve constituting the cylindrical base of the groove 10, which is annular.

The reaction plate 16 is accordingly mounted for rotation on the sleeve portion 182, being centred by the sleeve portion 182 of the hub 18, which is surrounded by the reaction plate 16.

The web portion 180 and the friction ring 280 each have a transversely orientated inner face, 181 and 281 respectively. The lateral inner faces 181, 281 are in facing relationship with each other and constitute the internal side flanks 181, 281 of the annular groove 10. The ring portion 160 has outer side flanks 161, 162 which consist of the third faces of the ring portion 160. The outer side faces 161, 162 are arranged to bear, and to engage frictionally, on the internal flanks 181, 162 under the action of the axially acting resilient means 70 which are engaged, firstly on the backing element 71 and secondly on the abutment element 271. In another version, at least one of the side flanks 181, 281 of the groove 10 is frusto-conical in form. Consequently the complementary outer side flank 162, 161 of the ring portion 160 is frusto-conical. In one embodiment, for example, the associated flanks 161, 281 are frusto-conical. In accordance with one feature, the internal hub 18 is so configured as to define a cavity 9 which is radially inward of the inner ring portion 160 of the reaction plate 16. In FIGS. 1 to 4, 7 and 8, the hub 18 is of reduced thickness radially inwards of the internal ring portion 160, and the cavity 9 is open axially away from the primary flywheel. In these Figures, the cavity 9 is accordingly blind, and the base of the cavity 9 is bounded by the internal hub 18, and in this example by the web portion 180 of the hub 18. The web portion 180 is integral with the hub 18, or else it is fixed on the latter, in a manner to be described below, in such a way that the hub 18 is able to be a two-material hub.

The abutment element 271 is mounted in a cavity 9 which is formed in the internal hub 18 at the outer periphery of the latter. The cavity 9 is in the form of a recess in FIGS. 1 to 4. The recess is formed in the hub 18 which is of reduced thickness at this point.

In FIGS. 1 to 4, the recess 9 is bounded radially on the outside by the sleeve portion 182, having an axis X—X, and laterally, that is to say transversely, by the web portion 180 which extends transversely on either side of the sleeve portion 182 and which constitutes the transverse base of the cavity 9.

At its inner periphery, the recess 9 is bounded by the main portion 184 of the internal hub 18, which is thicker than the web portion 180 which projects radially outwards with respect to the main portion 184, in which the passage holes 20 are formed. The web portion 180 is accordingly a projecting element of the hub 18.

According to one feature, the web portion 180 carries the sleeve portion 182 in superelevation, and in this example the inner periphery of the sleeve portion serves for centring the outer periphery of an axially orientated annular portion 173 which joins the friction ring 280 to the abutment element 271 mounted within the recess 9, which constitutes a cavity open axially in a direction away from the transverse element 14. The cavity 9 may be obtained by moulding, or alternatively by machining. In this example it is necessary in all cases to machine the inner periphery of the sleeve portion 182 that constitutes a centring means. The sleeve portion 182, through its outer periphery, serves to centre the internal ring portion 160.

The abutment element 271 in this example extends radially outside the backing element 71, which lies in generally the same transverse plane as the friction ring 280.

The backing element 71 is offset axially with respect to the abutment element 271, in a direction away from the primary flywheel 12.

The abutment element 271 is located generally within the thickness of the internal hub 18, in the recess 9. The backing element 71 projects axially outside the internal hub 18, on the side of the dorsal face of the latter which is turned away from the primary flywheel 12 and resilient damping means 15.

The abutment element 271 is extended radially inwards by at least one transverse connecting lug 272 which is engaged in a radial notch 185 formed in the outer periphery of the main portion 184 of the internal hub 18. In this example, two lugs 272 and two notches 185 are provided. The notches 185 and the lugs 272 are diametrically opposed to each other. A mating cooperation exists therefore between the lugs 272 and the hub 18, so that the friction ring 280 is fixed in rotation to the hub 18 while being able to be displaced axially with respect to the latter, in particular in response to wear. The number of lugs 272 and notches 185 does of course depend on the application. The notches 185 have a rounded inner radial end (FIG. 4) to avoid jamming of the lugs 272, and are oblong in shape. The lugs 272 have a form which is complementary with that of the notches 185, and penetrate into the latter with a fitting clearance.

The lugs 272 and notches 185 can alternatively take some other form.

The lugs 272 are offset radially and also axially with respect to the abutment element 271, in a direction towards the primary flywheel 12. With this arrangement, the lugs 272 are interleaved axially between the ring 72 and the transverse base 186 of the notches 185. The notches 185 extend the recess 9 radially inwards, and are open axially outwards, that is to say in the direction away from the primary flywheel 12. The same is true of the recess 9, the transverse base of which consists of the web portion 180, which enables axial size to be reduced. In this example, there is an axial clearance between the generally transversely orientated base 186 of the notches 185 and the rotational driving lugs 272. There is an axial clearance also therefore between the abutment element 271 and the web portion 180. The lugs 272 are integral with the abutment element 271, which is itself integral with the friction ring 280.

The portions 272, 271, 173 and 280 are all part of the same single component, which in this example is press-formed from sheet metal, in order to reduce axial size and costs.

The axially acting resilient means 70 are, in accordance with one feature, located radially inwards of the internal ring portion 160, which is fixed with respect to the reaction plate, and in this example they consist of a Belleville ring so as to reduce the number of components and so as to give good control of the load exerted by the ring 70 on the friction ring 280. In another version, the Belleville ring 70 is replaced by a diaphragm. In all cases the axial size of the ring 70 is minimised. The axially acting resilient means may of course consist of a corrugated resilient ring of the "onduflex" washer type. In that case, the backing element 71 and the abutment element 271 are located generally on the same circumference, and are of annular form.

The backing element 71 is also integral with its support ring 72, and is connected to the outer periphery of the ring 72 through a junction zone 73 having an S-shaped cross section. The ring 72 in this example is press-formed from sheet metal and has at its inner periphery slots 74 which are aligned axially with the passage holes 20 for passage of the heads of the screws 21 and the screw fastening tool or tools.

The ring 72 also has holes 174 which are in circumferential alternation with the slots 74 and which are located radially on a mean pitch circle larger than that of the holes 20 and slots 74. The notches 185 are located radially outside two diametrically opposed holes 20, circumferentially between two holes 174, each of which is in axial register with a hole 274 formed in the internal hub 18. The internal hub 18 is thus of maximum mechanical strength, as can be seen best in FIG. 4; the notches 185 are located generally on a mean pitch circle of greater diameter than that of the holes 174, 274. The Belleville ring 70 bears at its outer periphery on the abutment element 271, and at its inner periphery on the backing element 71, so as to bias the friction ring 280 towards the web portion 180. Preferably, the ring 70 is mounted before the fastening, which in this example is obtained by riveting, of the ring 72 on the hub 18 by means of the pivot pins 45, which is carried out in a way to be described below.

Because of the axial clearance between the lugs 272 and the transverse base 186 of the notches 185, the ring 280 can initially be inclined towards the web portion 180, being then straightened up under the action of the resilient ring 70, so that it perfectly matches the outer face 161 of the ring portion 160, the other outer face 162 of which bears perfectly on the machined internal face 181 of the web portion 180. Thus, the performance and useful life of the torque limiter 19 are improved because maximum contact is obtained between the machined external transverse faces 161, 162 of the ring portion and the internal flanks 281, 181 of the groove 10, the ring portion 160 being gripped axially between the flanks 181, 281 of the groove 10 which is open radially outwards in a direction away from the axis X—X.

Moreover, all of this is made possible because the axially acting resilient means 70 are not fixed with respect to the components 71 to 73 and 271, 272, 273, 280.

By comparison with the prior art, axial size is not increased, and is on the contrary slightly reduced. Thus, as mentioned above, at least one of the flanks 181, 281 and at least one of the external flanks 162, 161 may be of frusto-conical form without increasing axial size as compared with the prior art. In addition, the resilient means 70 are further away from the friction face 17 and are therefore heated less, because they are located radially inside the ring portion 160 and partly extend into the cavity 9.

In this example the ring 280 and the backing element 71 are in generally the same plane as the friction face 17, the internal hub 18 being slightly offset axially in a direction towards the transverse element 14 with respect to the friction face 17.

Thus, the torque limiter 19 is similar to the friction means 46, the said limiter comprising a first friction ring 280 radially surrounding a second ring which consists of the backing element 71. The rings 71, 280 are in generally the same plane. The rings 71, 280 are joined together by the axially acting resilient means 70.

The pivot pins 45 drive in rotation the friction means 46 at one of their ends and the backing element 71 at their other end, the mean diameter of the friction ring 148 being generally equal to that of the friction ring 280. In this way, good distribution of the forces is obtained within the dual mass damping flywheel, and axial size is minimised with the casings 26 extending radially inwards of the main portion 184 of the internal hub 16, and also the active surface of the control ring 146. The pivot pins 45 also serve for the fastening of the ring 72, and therefore the backing element 71, to the hub 18 by riveting.

In this example the pivot pins 45 have a collar portion 145 which is arranged to come into contact with the transverse face of the internal hub 18 that faces towards the friction means 46 and plate 14. The collar portion 145 is extended by a body portion passing through the aligned holes 274, 174. The body portion has a head at its free end, beyond the support ring. This head is upset into contact with the ring 72 so as to secure the ring 72 to the hub 18, by riveting by means of the pivot pins 45. In this way the ring 72 is matched to the internal hub 18. In a modification, the ring 72 is matched to the hub 18 by separate fastening means of the pivot pins 45.

The face of the web portion 180 which faces towards the plate 14 is in generally the same plane as the transverse face of the plate 16 that faces towards the plate 14. The torque limiter 19 is generally mounted within the thickness of the plate 16 by virtue of the cavity 9 formed in the internal hub 18, which facilitates cooling of the portion 184 of the hub 18 and cooling of the rolling bearing 8.

The upset heads of the pivot pins 45 are also generally located within the thickness of the reaction plate 16. The groove 10 is bounded mostly by the internal hub 18 and has a side flank formed by the friction ring 280 which is separate from the web portion 180 and therefore from the hub 18. The said ring 280 is able to be displaced axially with respect to the web portion 180, while being coupled in rotation to the hub 18 by virtue of the internal lugs 272 and notches 185. The friction ring 280 surrounds the backing element 71, while the resilient means 70 are located radially between the friction ring 280 and the support ring 72.

The axial position of the ring portion 160 therefore depends on the thickness of the web portion 180. It will be appreciated that the elastic arrangements 15 can in this case be of very great radial length, and that in accordance with the invention, the hub 18 is hollow so as to contain the abutment element 271.

The backing element 71 and the abutment element 271 can of course be of divided form, being divided for example by means of slots. The friction ring 280 and the ring 72 may be divided into annular sectors. In that case, each sector of the friction ring 280 includes at least one lug 272. In another version, the backing element 71 and the abutment element 271 are attached by being, for example, fastened on the ring 72 and the ring 280 respectively, for example by welding.

Thanks to the invention, for a given axial size, coatings and/or friction liners can be interposed between the ring portion 160 on the one hand and the flanks and base of the gorge 10 on the other. The same is true in the other Figures. In this way it is possible for an increased torque to be transmitted, because the coefficients of friction of the friction coatings and/or friction liners can be increased. As is known, the torque limiter 19 enables the internal hub 18 to be assembled with the reaction plate 16 through the side faces of the ring portion 160 in FIGS. 1 to 4 and 7 to 9, or through only one face of the ring portion 160' in FIGS. 5 and 6 to be described below. This torque limiter acts when the internal combustion engine of the motor vehicle is started and stopped, in order to protect the components of the dual mass damping flywheel. Relative rotary movement of the reaction plate 16 with respect to the internal hub 18, with sliding movement of the internal ring portion, is made possible under these conditions, in which the resonant frequency is passed through.

When the vehicle is in motion, there is no relative movement between the reaction plate 16 and the internal hub 18. All of these effects are controlled by the axially acting resilient means 70 which determine the gripping force exerted on the ring portion 160 in the groove 10.

It will be noted that the torque limiter goes well with the presence of an electrical machine associated with the dual mass damping flywheel, as described in the embodiment of FIG. 5 in the document FR-98 09638 mentioned above, because the inertia of the primary flywheel 12 is then increased in such a way that it is able comfortably to overcome the action of the torque limiter.

FIG. 1 shows at 100 the output shaft of the engine and at 101 the input shaft of the gearbox, given that the hub of the friction disc extends into the first hub 6.

The springs 24, 25 can of course be replaced by tension springs with puller members articulated on the pivot pins 44, 45.

For example there may be helical springs with terminal loops mounted on the pivot pins 44, 45.

The resilient members 24, 25 work in all cases between the transverse element 14 and the internal hub 18 which is mounted for rotation on the primary flywheel.

The friction means 46 may also act at the level of the rolling bearing 8.

Figure 2:
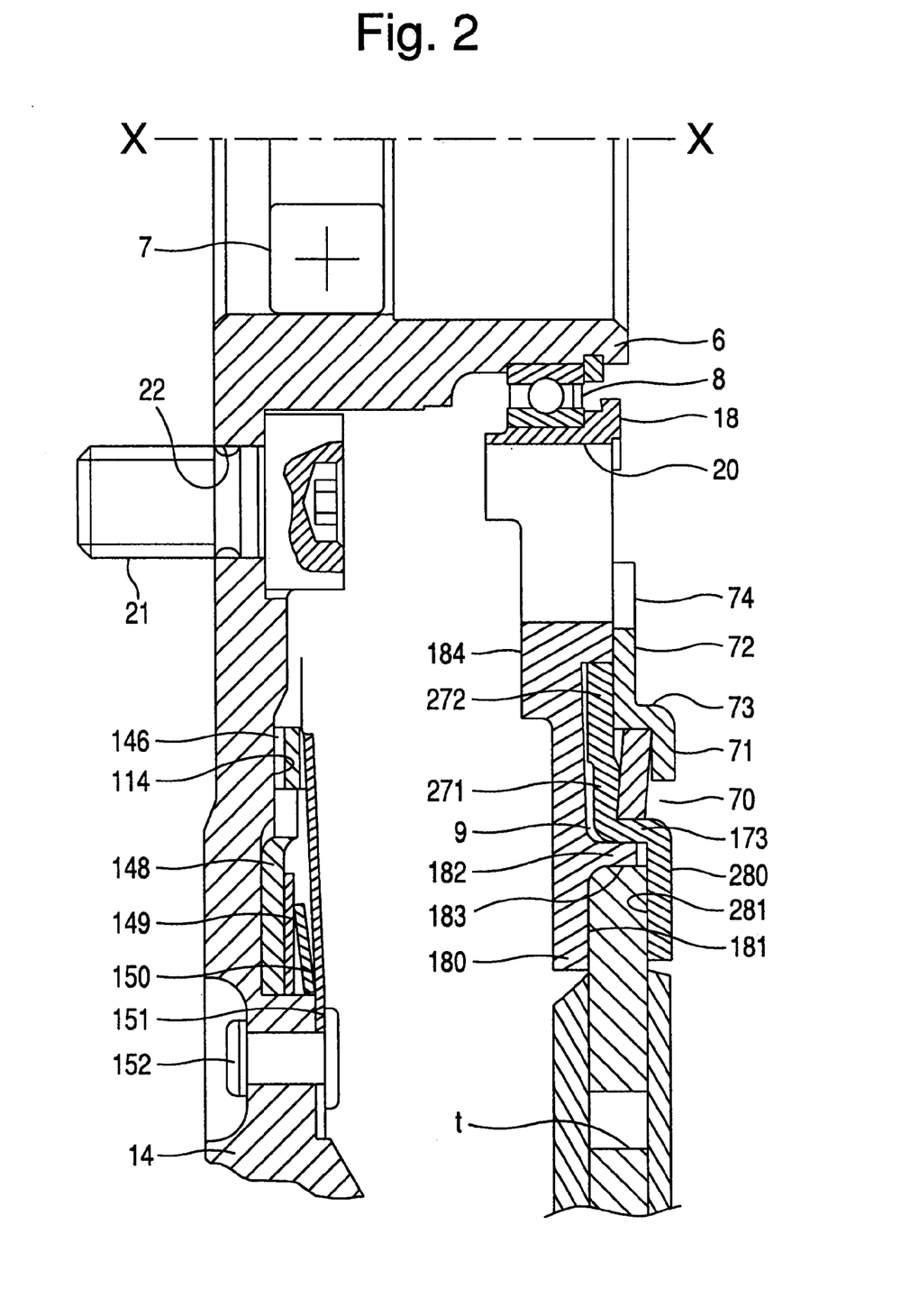
FIG. 2 is a view on an enlarged scale of the limiter in the lower part of FIG. 1.

The ring portion 160 is a separate component, which is fixed for example by being moulded in situ, or seamed, on the reaction plate 16. The ring portion 160 is for example partly encapsulated within the plate 16 and accordingly has an external extension which penetrates into the plate. This extension is preferably formed with holes and/or projecting elements to improve anchoring. During the operation of applied moulding, the material of the plate 16 penetrates into the holes and/or is wrapped round the projecting elements. The ring portion 160, which in all cases is fixed with respect to the plate 16 of the torque limiter 19, works between the inner periphery of the reaction plate 16 and the outer periphery of the internal hub 18, and extends radially inwardly of the friction face 17, which is arranged to be coupled in rotation disengageably to the input member 101 of the transmission. FIGS. 1 and 2 show such a ring portion applied by in situ moulding. The same is true in FIGS. 5 and 7 to 9. FIGS. 2, 5 and 7 to 9 show the holes formed in the ring portion 160, 160' respectively, which permit inclusion of the casting material during in situ moulding, on the latter, of the outer part of the assembly consisting of the reaction plate and the internal ring portion. These holes may be replaced and/or completed by protecting elements which are press-formed in the internal ring portion so as to make or complete the hooked attachment of the internal ring portion on the reaction plate. The holes may be formed in projecting elements, which can for example be of bowed form. The number of projecting elements and/or holes depends on the application. Similarly, the depth of penetration of the internal ring portion into the reaction plate depends on the application. The ring portion reinforces the reaction plate. It can be arranged that the ring portion extends over the whole height of the reaction plate so as to project radially from the latter, so that it then has, at its outer periphery, an axially orientated annular flange which is directed axially away from the primary flywheel 12, so as to enable the cover plate of the clutch to be fastened in the manner described in the document FR-A-2 718 806 filed on Oct. 20, 1995. An arrangement of this kind can be seen in FIG. 9, in which such a flange, serving for fastening of the clutch cover plate, can be seen at 160a. The projecting elements may consist of inclined tongues which are press-formed in the internal ring portion, as can be seen at t" in FIG. 9.

In all cases, the internal ring portion projects radially inwards, that is to say towards the axis X—X in FIGS. 1 to 5. The ring portion extends the reaction plate 16 inwardly. It is of a material which has a coefficient of friction different from that of the reaction plate.

The internal ring portion is of metal, being preferably of sheet steel in the manner described above.

The ring portion constitutes the central portion of the assembly consisting of the internal ring portion and the reaction plate.

Similarly, it can be arranged that the web portion 180 may be carried by and fastened, for example by welding, in situ moulding, or seaming, on the main portion 184 of the internal hub 18, in particular to facilitate the formation of the cavity 9.

The attached ring 160 or the attached web 180 may accordingly be of different materials from those of the plate 16 and hub 180 respectively, so that these can be two-material components. The fact that the ring 160 or the web 180 are attached as separate components enables their thickness to be reduced and therefore enables the overall axial size of the torque limiter to be reduced.

The ring 160 can then be made of steel or another material that wears less rapidly than a casting. This material can also be one with an improved coefficient of friction. With this arrangement, which is applicable to any type of torque limiter, wear is reduced, in particular in the ring, while the hub and the ring undergo wear in the same way. The ring 160 or the web 180 is then of metal in one embodiment. The ring 160 or the web 180 is in one embodiment made of press-formed metal plate covered with a wear resistant coating. It is for example locally tempered or coated with a layer of nickel or molybdenum.

The ring 72 is a support member for the backing element 71. Ventilating fins may be formed in this ring 72 by stamping and bending.

There is an axial clearance between the abutment element 271 and the internal hub 18, for good pinching and gripping of the ring 160 in the annular groove 10.

For the formation of the ventilating means, the web 180 can be perforated in the region of the cavity 9 so as to improve ventilation and to give better cooling to the torque limiter 19 and the bearing means 8. The hole in the web 180 is then open into the hollow of the hub 18.

In the drawings, the abutment elements 271 and the backing element 71 are orientated transversely and parallel to each other. In another version, the abutment elements 271 and the backing element 71 may be inclined, particularly where the flanks 161, 281 are inclined.

It will be evident from this description and the drawings that the resilient means 70, the abutment element 271 and the backing element 71 are located radially inwards of the groove 10 and therefore radially inwards of the reaction plate 16.

The pins 147 are in the form of projecting elements of fastening members 45 for fastening the support member or members 72 of the backing element or elements 71.

In the drawings the reaction plate 16 has a constant thickness, its ring portion 160 being of reduced thickness.

In other versions, the thickness of the plate may be inconstant. In order to facilitate the cooling of the torque limiter and the hub, holes may be provided, for example in the junction zone 73 of the ring 72. These holes are part of ventilating means fitted in the region of the torque limiter.

The inner radial edge of the cavity 9 may serve for centring the friction ring 280, which is then extended radially inwards from its abutment element or elements 271. This is appropriate where the friction ring is of frusto-conical form. It will be noted that the junction zone may be press-formed so as to form a deflector which prevents any oil, leaking from the axis X—X, from contaminating the friction face 17.

Figure 7:
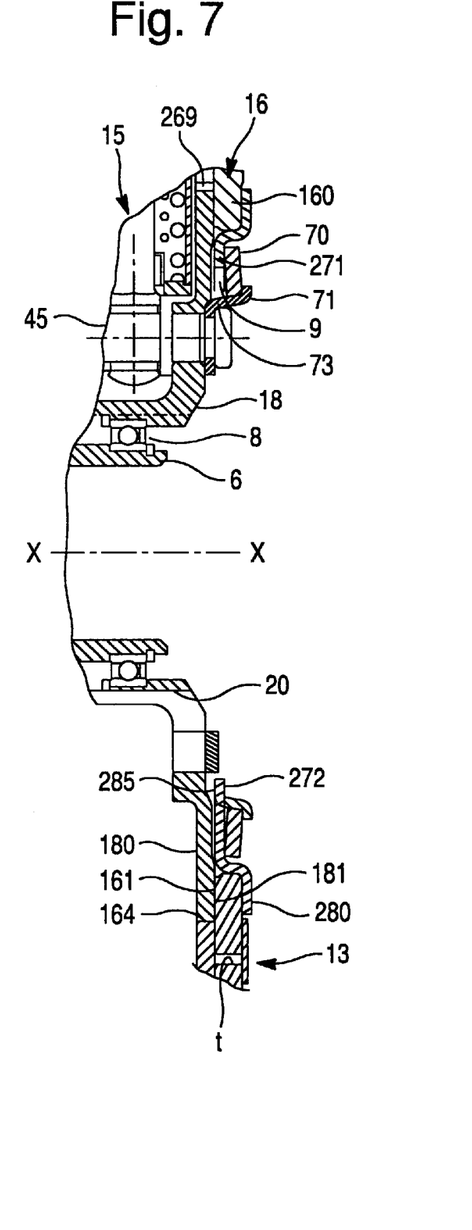
FIGS. 7 and 8 are partial views in axial cross section of a dual mass damping flywheel in a fourth and a fifth embodiment, respectively.
Figure 8:
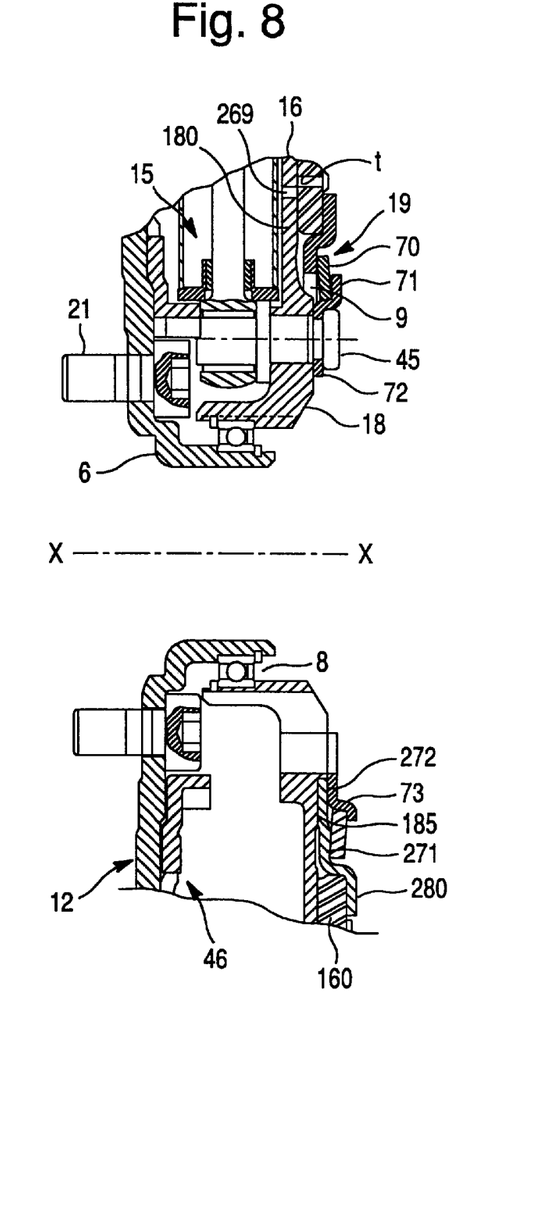

The base of the groove may of course, instead of being defined by the internal hub, be defined by the friction ring 280, as can be seen in FIGS. 7 and 8, which enables the sleeve portion 182 of FIG. 2 to be omitted and therefore enables radial size to be reduced. In other words, for the same internal diameter it is possible to increase the size of the Belleville ring 70.

In another version the internal diameter of the ring portion 160 may be reduced, as well as that of the friction face 17 of the reaction plate 16. In this version, the reaction plate 16 is centred by the outer periphery of the web portion 180 of the internal hub 18, the form of which is simplified because it does not have the sleeve portion.

To this end (see FIG. 7), the reaction plate 16 has an axially orientated annular surface 164 which joins the side face 163 of the plate 16, facing towards the primary flywheel 12, to the outer periphery of the face 161 of the ring portion 160. It is this face 161 which is arranged to cooperate frictionally with the face 181 of the web portion 180. The surface 164 therefore makes intimate contact with the outer periphery of the web portion 180, and is therefore formed at the change of thickness of the plate 16 at its inner periphery so as to define the ring portion 160. There is then a problem of evacuating debris formed by the contact between the faces 161, 181, because, by contrast with what happens in FIGS. 1 to 4, the surface 164 prevents such debris from being evacuated.

In order to overcome this problem, the web 180 is formed with notches 269 open at the outer periphery of the web 180. The notches 269 are for example in the form of half moons. Thus the hub 18 is of reduced thickness radially inwards of the ring portion 160 and, by its web portion 180, it defines a cavity 9 radially inwards of the ring portion 160 for receiving the abutment element 271 of the friction ring 280. This abutment element 271 is joined by an inclined portion 273 to the friction ring 280. The portion 273 constitutes the base of the groove which is defined by the web portion 180 and the ring 280. The base 273 does not then serve to centre the ring portion 160.

In this version the abutment element 271, integral with the friction ring 280, is coupled in rotation to the ring 79 which is integral with the backing element 71.

For this purpose, as in FIGS. 1 to 4, the abutment element 271 is extended radially inwards by at least one lug 272 which extends through an associated hole 285 formed in the junction zone 73 joining the ring 72 to the backing element 71, the said zone 73 being orientated generally axially and extending away from the primary flywheel. In preferred versions, at least two lugs 272 and two associated holes 285 are provided, these being diametrically opposed to each other, with the lugs 272 being engaged with an axial clearance in the holes 285.

All combinations are of course possible, thus, as can be seen in FIG. 6, the friction ring 280 may comprise at least one lug 272 engaged in a notch 185 of the hub 18 as in FIGS. 1 to 4, while the centring of the reaction plate 16 is obtained by means of the web portion 180 as in FIG. 5.

In a further version, the holes 285 of FIG. 7 are replaced by hollow pressed-out portions 385, which are for example U-shaped and which are formed in the junction zone 73, with the lugs 272 penetrating into these pressed out portions so as to couple the ring 280 in rotation to the hub 18 with axial mobility.

In FIGS. 7 and 8, the hub is of reduced thickness at its outer periphery so as to define the cavity 9. It is the web portion 180 which, with the ring portion 160, defines this cavity 9 which is open axially in the opposite direction from the primary flywheel 12.

The web portion 180 constitutes the base of the cavity 9 which is delimited in all the drawings by the backing element 71, which is low in height for opening of the cavity 9.

In another version, the backing element 71 and the junction zone 73 may be formed monobloc with the hub 18, being integral with the latter. To this end, the reaction plate 16 is preferably centred by the web portion 180 as in FIGS. 5 to 7. The axially acting resilient means then preferably consist of an open corrugated washer for mounting in the cavity 9. It is possible to use for this washer a ring of the kind described in the document FR-A-2 747 441.

Preferably the abutment element 271 is mounted on the skew within the cavity 9, and only one lug 272 is provided.

The low thickness of the torque limiter enables the thickness of the dual mass damping flywheel to be reduced.

The invention makes it possible to control the thickness of the internal ring portion. In this way, the thickness of the internal ring may be reduced or it may be given a more complex form, as can be seen at 160' in FIG. 5, the ring 160' being thinner than that of FIGS. 1 and 2. In this Figure, the ring 160' extends radially more towards the interior, that is to say towards the axis X—X, so that the web portion 180' of the internal hub 18' is of reduced height whereby the hub 18' is more inexpensive since it uses less material.

In FIG. 5, the ring 160' has at its inner periphery an annular, axially orientated bent edge b which is in intimate contact with the outer periphery of the hub 18' which thereby serves for centring purposes. The axially acting resilient means 70' bear on the backing element 71'. In this example these means consist of a ring 70' of elastic material, which is of elastomer in this case and is fixed on the backing element 71', for example by adhesive bonding or adhesion such as in situ vulcanisation.

The ring 70' is mounted with prestress between the ring 160' and the backing element 71' which is integral with the ring 72' riveted on the pivot pin 45. The ring 70' biases the internal ring 160' into contact with the face 101' of the web portion 180. For this purpose, the resilient ring 70' is coated, at its free end adjacent to the ring 160', with a layer such as to enable it to engage frictionally directly on the ring. In another version, a plate is attached on the free end of the resilient ring 70' so as to engage frictionally on the internal ring 160', the form of which is complex like the ring 72', the latter being deeper radially than in FIGS. 1 to 4. The ring 160' and the ring 72' are made by press-forming, in such a way as to form, firstly, a shoulder on the backing element 71' so as to provide partial radial retention against outward displacement of the resilient ring 70', and secondly, to form a portion which is offset axially towards the secondary flywheel on the ring 160', for engagement of the ring 70'.

By contrast with FIG. 1, the ring 160' is offset axially towards the primary flywheel 12', so that only one of its faces is active, namely the one which is arranged to come into contact with the web portion 180'. In this way a cage is defined between the ring 72' and the ring 160', and therefore a cavity 9'. The ring 160' is mounted in the groove 10' that is defined by the web portion 180' and the ring 72'. Preferably, tongues U are formed in the ring 160', and also, though this cannot be seen, in the friction ring 280'.

In this Figure, the holes formed in the ring 160' for the in situ moulding on the latter of the portion 16'e of the plate 16 can be seen at t. The ring 70' thereby also constitutes the friction ring 280'.

As can be seen in FIG. 6, in a further embodiment, the faces 181' and 161' of the web portion 180' and ring portion 160' are of course of frusto-conical form, while the reaction plate 16' is centred directly by the ring 72', which has at its outer periphery an axially orientated annular flange 19" directed towards the ring 160'. The outer periphery of the flange 19" is in intimate contact with the inner periphery of the reaction plate, over a zone which is larger than that in FIGS. 7 and 8 extending between the web portion and the reaction plate.

The torque limiter includes a Belleville ring 70' which bears on the ring 72' and more precisely on the backing element 71' of the latter, and on the friction ring 280" so as to bias the latter into frictional contact with a disc 160'''. The ring 280" is provided at its outer periphery with lugs (not given a reference numeral), each of which penetrates into a groove formed by stamping in the flange 19" of the inner periphery of the latter. Meshing means P are interposed between the flange 19" and the friction ring 280", on which there is fixed a friction liner g for frictional contact with the disc 160'''. The ring 280" is therefore coupled in rotation to the ring 72'. The disc 160''' is provided with axial lugs P at its outer periphery, each of which penetrates into a hole (not given a reference numeral) which is formed in the internal ring for coupling the disc 160''' in rotation to the ring 160'.

In another version, the liner g is fixed on the disc 160'''. The friction ring 280''' therefore constitutes, in all cases, a distribution ring for engagement of the inner periphery of the Belleville ring 70', in engagement at its outer periphery on the backing element 71', which is stiffened by the flange 19'''.

The ring 160' is of sheet steel, as is the ring 72', without any treatment of the said components due to the presence of the disc 160'''.

The sheet metal internal ring 160' is fixed to the cast reaction plate 16' by seaming, indicated by the reference S. More precisely, the outer edge of the ring 160' has axially orientated lugs 160", each of which passes through a stepped hole 16" formed in the reaction plate 16.

The end of each hole is therefore wider, with a shoulder v being formed to join the larger end of the hole 16" with the main portion of the latter. The material of the free end of each lug 160" is upset locally, in this example laterally, into contact with the shoulder V so as to achieve the seaming operation.

In FIGS. 5 and 6, the side face of the reaction plate 16' that faces towards the primary flywheel 12' is generally an extension of the internal ring portion 160', so that it is possible to mount the friction ring within a cage which is defined by the components 18', 72', 160', which reduces the axial size of the torque limiter 19' and of the dual mass damping flywheel, so that the web which is part of the hub of the friction disc has no need to be of sinuous form.

The first hub 6 may of course be attached, for example by welding, on the transverse element 14 of the primary flywheel 12, which consists of a radial plate of sheet metal as can be seen in FIG. 9. This plate 14 carries at its outer periphery a mass 229 which is for example of sheet metal. The plate 14 has at its outer periphery lugs 14' which are nested within the mass 229 and fixed by in situ applied moulding on the mass 229, the casting material of which penetrates into the holes t' in the lugs 14'.

Axial lugs 14", directed towards the reaction plate 16, are formed by local stamping and bending of the plate, and serve as abutments for the resilient damping means 15 which in this example are in the form of coil springs disposed circumferentially. The circumferential ends of these springs 15, which may be of curved form, and which may be preformed according to their length, bear on these lugs 14", which are preferably provided with fingers on each of their side faces to penetrate into the springs and hold the latter in place.

The ends of the springs 15, which are indicated diagrammatically in FIG. 9, also engage on axial lugs 373, 372 which are formed by stamping and bending so as to project from a radially orientated sheet metal member 371 which is fixed on the web portion 180 of the hub 18 by means of fastening posts 374. The lugs 372, 373 are directed axially towards the plate 14 and extend transversely on either side of the lug 14" in facing relationship with the latter. The hub 18 is also of sheet metal and is L-shaped. The ball bearing in the preceding Figures is replaced by a plain bearing 8' which is interposed radially between the fabricated hubs 18 and 6. The fabricated member 371 also has, at its outer periphery, axial lugs 375 which are directed towards the plate 14 and are radially inward of the lugs 373, 14" and 372. Notches (not shown) are formed at the free ends of the lugs 375, for penetration into the latter of radial fingers 376 which are provided at the inner periphery of a friction ring 377, which is in frictional contact with the outer periphery of the plate 14 under the action of a Belleville ring 378, which is in engagement on a ring 379 fixed on the mass 229, for example by screw fastening or any other means. The ring 377 is therefore equally a control ring which is part of the friction means 46 fitted radially inwards of the reaction plate 16. During relative movement between the two flywheels 12, 13, the springs 15 are compressed between the lugs 14" and 372, 373, and the fabricated member 371 drives the ring 377 in rotation, after a circumferential clearance, if there is one, has been taken up, and this activates the friction means 46. The internal ring portion 160 is fixed, in the way described earlier herein, on the reaction plate 16 which is a casting in this example.

The side faces of the ring portion are in engagement, respectively, with the member 371 and with a Belleville ring 70 which bears on the web portion 180, being mounted in rotation on the fastening posts 374, for example with the aid of lugs (not given a reference numeral), which have a notch that is engaged on a fastening post 374. Preferably, the side faces of the ring portion 160 are coated with a wear-resistant layer, or are hardened so as to avoid becoming rapidly worn, especially by the Belleville ring. The face of the member 371, which is orientated generally transversely and faces towards the ring portion 160, is also coated with such a coating or else hardened. In another version, the friction liner is interposed between the ring portion 160 and the member 371. This liner may be mounted free or else fixed to one of the elements consisting of the member 371 and the ring portion 160.

The torque limiter 19 therefore has a very much reduced axial size and includes the components 371, 160, 70. Because of the fastening posts 374, the member 371 constitutes the abutment element of the ring portion 160, and the web portion 180 constitutes the backing element. The torque limiter is of simple form, as is the dual mass damping flywheel.

The Belleville ring 375 may of course be coupled in rotation in mating cooperation with the mass 229.

In all cases, it is possible to choose the material of the reaction plate so that the secondary flywheel has a suitable inertia mass for a given inertia mass of the primary flywheel. It is sufficient to choose the material of the reaction plate.

In all of the drawings, the internal ring portion is thinner than the reaction plate.

What is claimed is:

1. A dual mass damping flywheel for coupling an internal combustion engine (100) in rotation to an input member (101) of a transmission system, in particular one intended for a motor vehicle, comprising a primary flywheel (12) having a transverse element (14) which is adapted to be coupled in rotation to the internal combustion engine (100), a secondary flywheel (13) comprising, firstly, a reaction plate (16) with a friction face (17) adapted to be coupled releasably to the input member (101) of the transmission system for rotation therewith, and secondly, an internal hub (18) surrounded by the reaction plate (16) and mounted rotatably on the primary flywheel (12), with resilient members (24, 25) operatively interposed between the transverse element (14) of the primary flywheel (12) and the internal hub (18) of the secondary flywheel (13), and with a torque limiter (19) being interposed operatively between the reaction plate (16) and the internal hub (18), wherein the torque limiter (19) is provided with axially acting resilient means (70) and includes, firstly, a ring portion (160) fixed with respect to the reaction plate (16) and extending radially inwards of the friction face (17) of the reaction plate (16), and secondly, an annular groove (10) for receiving the said ring portion (160), this groove being bounded by a first flank (181) fixed with respect to the internal hub (18), a second flank (281) which is part of a friction ring (280) which is rotatable with the internal hub (18), and a base (183, 283), characterised in that the internal ring portion (160, 160') is carried on the reaction plate (16) and is of a different material.

2. A dual mass flywheel according to claim 1, characterised in that the reaction plate (16) is of mouldable material and the internal ring portion (160, 160') is of metal.

3. A dual mass flywheel according to claim 2, characterised in that the reaction plate (16) is moulded in situ on the internal ring portion (160, 160').

4. A dual mass flywheel according to claim 3, characterised in that the internal ring portion (160, 160') includes hooking holes (t) and/or projecting elements (t").

5. A dual mass flywheel according to claim 2, characterised in that the internal ring portion (160') is attached by seaming on the reaction plate (16).

6. A dual mass flywheel according to claim 5, characterised in that the internal ring portion (160') has axial lugs (160") each of which is engaged in a stepped hole (16') having a shoulder (v), and in that the free ends of the lugs (16") are upset locally into contact with the shoulders (v).

7. A dual mass flywheel according to claim 1, characterised in that the internal hub (18) is so configured as to delimit a cavity radially inwards of the internal ring portion (160) of the reaction plate (16), for mounting therein at least one abutment element (271) which is fixed with respect to the friction ring (280) and offset axially towards the primary flywheel (12) with respect to the friction ring (280), and in that, radially inwards of the internal ring portion (160) of the reaction plate (16), the axially acting resilient means (70) bear on the abutment element (271) and on at least one backing element (71) which is fixed to a support member (72) fixed to the internal hub (18), whereby to grip the ring portion (160) between the flanks (181, 281) of the groove (10).

8. A dual mass flywheel according to claim 7, characterised in that the axially acting resilient means (70) are contained at least partly within the cavity (9).

9. A dual mass flywheel according to claim 8, characterised in that the abutment element (271) is offset axially towards the primary flywheel (12) with respect to the backing element (71).

10. A dual mass flywheel according to claim 9, characterised in that the axially acting resilient means (70) are located radially between the friction ring (280) and the support member (72).

* * * * *